Sept. 21, 1954 　　　A. M. FISCHER 　　　2,689,818
PURE CULTURE METHOD AND APPARATUS
Filed June 23, 1951 　　　2 Sheets-Sheet 1

INVENTOR.
Albert M. Fischer
BY
Attorney

Sept. 21, 1954  A. M. FISCHER  2,689,818
PURE CULTURE METHOD AND APPARATUS
Filed June 23, 1951  2 Sheets-Sheet 2
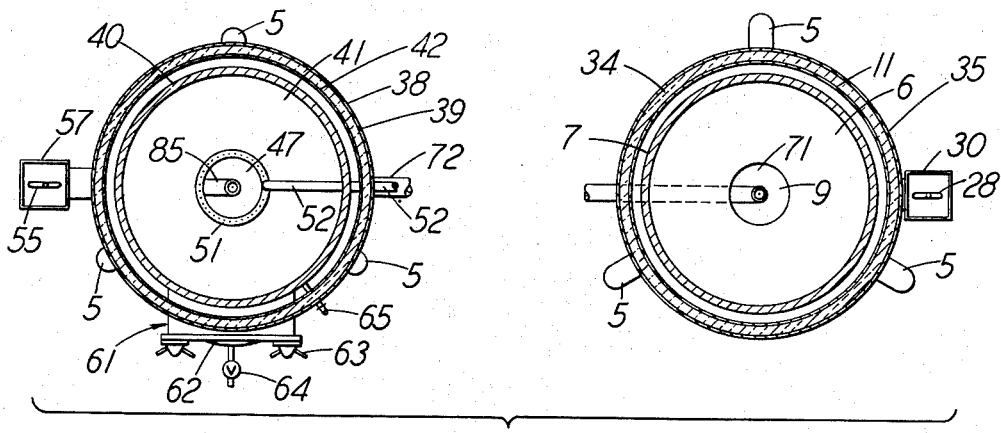
*Fig. 2.*
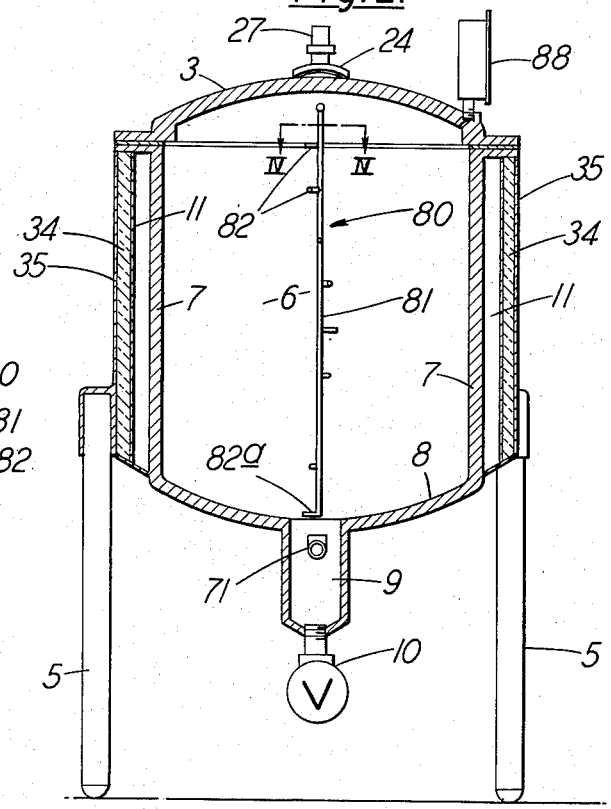
*Fig. 4.*
*Fig. 3.*
INVENTOR.
Albert M. Fischer
BY
Attorney Patented Sept. 21, 1954

2,689,818

UNITED STATES PATENT OFFICE 2,689,818

PURE CULTURE METHOD AND APPARATUS

Albert M. Fischer, Dowagiac, Mich., assignor to Metal-Glass Products Co., Belding, Mich., a corporation of Michigan Application June 23, 1951, Serial No. 233,173

20 Claims. (Cl. 195—83)

This invention relates to the cyclic propagation of selected pure cultures of micro-organisms and unicellular fungi under aseptic conditions and more particularly to a method and apparatus therefor by means of which the time required for propagation is greatly reduced while the vigor of the resulting culture is materially increased.

The micro-organisms contemplated by my invention include the various strains of yeast as used in bakeries, wineries, distilleries, breweries and the yeasts used for food and pharmaceutical purposes. My invention may also be used in the propagation of cultures of such microorganisms as aerobic bacteria, molds, bacilli and generally for all other micro-organisms used in industrial processes.

In the preparation of products utilizing microorganisms and unicellular fungi in their production, it is of the utmost importance that the culture of the selected micro-organism or unicellular fungi be pure. Particularly in the brewing industry is this of the utmost importance because the particular yeast strain and its purity is critical in determining the flavor of the beer. A brewery, having once obtained a particularly desirable strain of yeast, makes every effort to maintain this strain both vigorous and pure.

To develop cultures of these micro-organisms or unicellular fungi a sterilized and filtered culturing medium is inoculated with a small quantity of the selected micro-organism or unicellular fungi. The inoculated culturing medium is then normally kept at an optimum temperature for the propagation of the particular culture and aerated for a period of time while the culture develops. It is essential to sterilize the culturing media to destroy any micro-organisms or unicellular fungi which might be present to modify the desired strain. The filtering removes substantially all solids from the sterilized culturing media. A clear culturing medium is desirable as trub has a tendency to retard fermentation. Due to the special design of the lower part of the propagator, impurities of larger magnitude tend to collect in a special compartment at the bottom of the propagator where they may be easily ejected.

The sterilization of the culturing media is essential to insure aseptic propagation. The heat employed to effect this sterilization destroys a substantial portion of the essential growth factors such as the heat sensitive vitamins of the B-complex group. Unless these growth stimulating vitamins, including $B_1$ and $B_6$, and possibly other growth stimulating vitamins, the presence or necessity of which have not yet been determined, are present, it has been found that most of these micro-organisms and particularly the yeasts cannot propagate. Further, within certain limits, the rate of propagation is closely associated with the quantity of B-vitamins present, considering other factors to be favorable.

Although yeast, during propagation manufactures certain of the B-vitamins, it does not manufacture all those of the B-vitamins essential to propagation. When there are no traces of the growth producing B-vitamins present, the rate of propagation is slow and eventually ceases altogether. One of the primary objects of my invention is to enrich the sterilized culturing media with growth stimulating B-vitamins, whereby the rate of propagation of the new yeast culture will be greatly accelerated. At the same time, the resulting culture is more vigorous because of the presence of a higher percentage of strong, fully developed, active yeast cells. Another object of my invention is the production of a clear and filtered culturing medium.

It is a further object of my invention to provide cyclic propagation of micro-organisms or unicellular fungi cultures characterized as an unvarying strain identical to the original inoculum.

Both the sterilization and the propagation must be carried out in closed vessels, sealed against the entrance of any non-sterile air. It is, therefore, an additional object of my invention to provide a sealed, integrated, flow system between the propagator and the sterilizer.

These and other objects and advantages of my invention will be seen immediately by those acquainted with the use and propagation of micro-organisms or unicellular fungi upon reading the following specification and the accompanying drawings.

In the drawings:

Figure 2 is a sectional view taken along the plane II—II of Figure 1 but showing only that portion of the pipe structure used to aerate the propagator and sterilizer.

Figure 3 is a sectional, elevation view taken along the plane III—III of Figure 1.

Figure 4 is a sectional view taken along the plane IV—IV of Figure 3.

Figure 1:
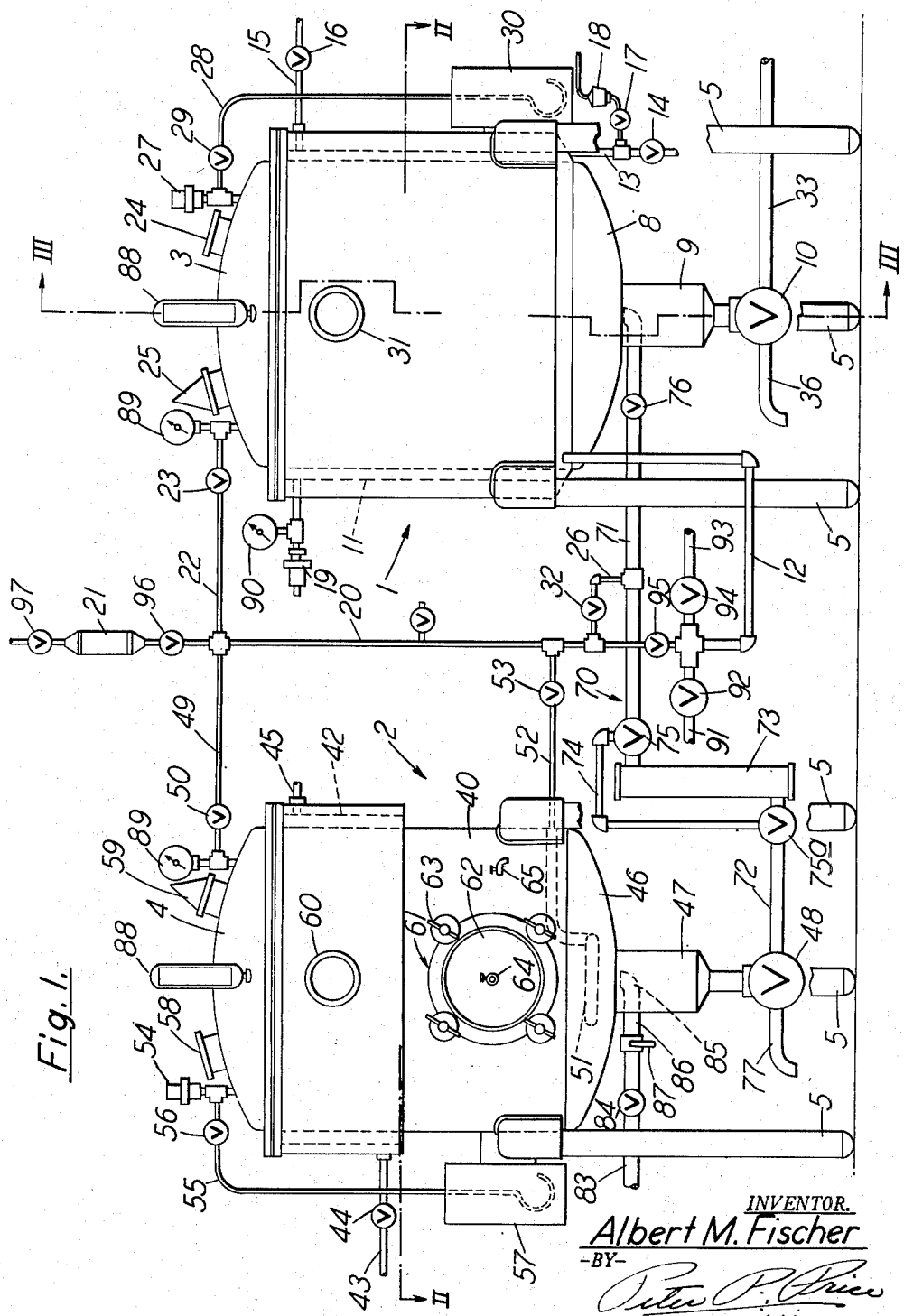
Figure 1 is a side elevation view of the apparatus used in carrying out my invention.

Although the principles underlying the method and apparatus of my invention are applicable to a wide range of operations, for the purpose of clarity my method and apparatus are described as applied to the brewing industry for the propagation of pure strains of yeast of the class saccharomyces cereviseae.

In executing the objects and purposes of my invention, I have provided a pair of closed vessels, one being a sterilizer and the other a propagator. The sterilizer is equipped with means for both heating and cooling and the propagator with means for cooling only. I have connected these vessels, by means of suitable equipment, whereby a portion of the wort in the propagator containing the yeast culture rich in B-vitamins may be injected into the hot sterilized wort in the sterilizer. The vitamins contained in the yeast cells returned to the sterilizer are not available at the time they are returned to the sterilizer. Therefore, these cells are subjected to a sufficiently elevated temperature of the wort in the sterilizer, under a controlled pH condition, to cause plasmolysis. This makes the growth stimulating vitamins available to the seed yeast when the sterilized wort is transferred to the propagator. This so fortified charge in the propagator, when inoculated, will rapidly develop a vigorous and plentiful yeast culture because of the growth stimulus given by the initial presence of the B-vitamins.

In the following description the terms "upwardly" and "downwardly" are frequently used and are to be taken as meaning "upwardly" as the apparatus is normally used and as it appears in Figure 1 and "downwardly" away therefrom.

APPARATUS

Referring now to the drawings in detail, the numeral 1 indicates a sterilizer vessel and the numeral 2 a propagator vessel. Both of the vessels are closed, the sterilizer 1 by a removable cover 3 and the propagator 2 by a removable cover 4. The vessels are supported by adjustable legs 5.

The sterlizer 1 consists of a main chamber 6 (Figure 2) surrounded by a pressure resisting wall 7 and closed at the lower end by a downwardly concave bottom 8. At the center of the bottom 8 is a collection chamber 9 connecting at its lower end with the three-way valve 10. The main chamber 6 is surrounded by an annular heating jacket 11 into which steam is admitted through the pipe 12 and from which condensate is removed through the outlet pipe 13, the valve 17 and steam trap 18. A cooling fluid such as water may be passed through the jacket 11 by means of the pipes 12 and 15. When the jacket 11 is drained, the valve 14 is opened and the valve 17 is closed. The overflow pipe 15 is equipped with a valve 16 to prevent escape of steam while the jacket 11 is being used as a heater. Maximum pressure in the jacket 11 is controlled by the pressure relief valve 19. The jacket 11 is surrounded by insulation 34 protected on its exterior surface by the shell 35.

Air for operating both the sterilizer 1 and the propagator 2 is obtained through the filter 21 and pipe 20. All of the air entering the filter 21 is suitably dehumidified prior to reaching the filter. The filter 21 is of a type suitable for removing all impurities such as bacteria and other foreign particles from the air. Although a number of different types of filters may be used for this purpose, I have found a filter having cotton as the filtering medium most satisfactory. Air is admitted to the upper end of the chamber through the pipe 22 and valve 23. The wort may be aerated and agitated by means of air admitted through pipe 26 and valve 32 to the pipe 71. The pipe 71 will be described more fully hereinafter. Air pressure is regulated in the sterilizer 1 by means of the relief valve 27 and is exhausted through the pipe 28 and the valve 29 (Figure 1). The lower end of the pipe 28 is submerged in water in the tank 30. This provides a water seal for preventing unfiltered air from entering the chamber 6. The chamber 6 is provided with a side viewing port 31.

The cover 3 of the sterilizer 1 is provided with a viewing port 24 to one side of the center of the cover. Diametrically across the cover 3 from the viewing port 24 is a light assembly 25 designed to illuminate the chamber 6. Within the sterilizer is a measuring gauge 80 suspended by a hook or other suitable means from the cover 3 (Figures 3 and 4). The viewing gauge consists of a central rod 81 about which are mounted a plurality of fins 82. From the top to the bottom of the rod 81 each fin is rotated 45° with respect to each of its adjacent fins. Nine of the fins 82 are used with the top fin 82 and the bottom fin 82a vertically aligned. By thus arranging the fins 82 in a helix, the difficulties of parallax are substantially overcome when determining the depth of liquid in the chamber 6 by observation through the viewing port 24. Since the fins are rotated in order, the position of the last visible fin with respect to the top fin will indicate the depth of the liquid in the chamber 6.

Wort is admitted to the sterilizer through the three-way valve 10 by means of the pipe 33. The valve 10 permits removal of the trub and other material remaining in the sterilizer 1, after the propagator has been charged, by directing this material through the discharge pipe 36.

The propagator 2 is quite similar in construction to the sterilizer 1. The propagator 2 is equipped with a pressure resistant shell 40, enclosing a chamber 41 (Figure 2), the upper end of which is surrounded by a cooling jacket 42. Water for operating the cooling jacket 42 is admitted through the pipe 43 and valve 44 and overflows through the pipe 45. The jacket 42 is surrounded by insulation 38 externally protected by the shell 39. This insulation prevents condensation when the cooling operation is in progress. The lower end of the chamber 41 is closed by a downwardly concave bottom 46 having a central, downwardly projecting collection chamber 47. The lower end of the collection chamber 47 communicates with the three-way valve 48. The valve 48 is provided with a discharge pipe 77.

Air is admitted into the top of the chamber 41 through the conduit 49 and valve 50 connecting with the pipe 20. An aerator 51 is concentrically located in the lower end of the chamber 41 and is provided with air by the conduit 52 and valve 53 connecting with the pipe 20. The aerator is within the concave bottom 46 but above the junction of the bottom 46 and the collection chamber 47. Air is exhausted from the top of the chamber 41 by means of the valve 56 and pipe 55. The pressure relief valve 56 safeguards the propagator against excessive pressure. The lower end of the pipe 55 is submerged in a water filled tank 57, similar to the tank 30, forming a water seal for preventing the entrance of nonsterile air into the propagator 2. The cover 4 of the propagator 2 is provided with an observation port 58 to one side of the center of the cover. Diametrically across the cover 3 from the observation port 58 is a light assembly 59, designed to illuminate the chamber 41. Within the chamber 41 there is suspended a measuring gauge identical to the measuring gauge 80 in the sterilizer 1.

A side, visual, inspection port 60 is located in the upper portion of the propagator 2. A side entrance port 61 is located in the lower portion of the propagator 2. The entrance port 61 is closed by a cover plate 62 secured over the entrance port 61 in a pressure tight seal by means of the winged nuts 63. A small, valved conduit 64 communicates with the chamber 41 through the center of the cover plate 62 for injecting a quantity of inoculum into the propagator 2. Samples of the culture within the propagator may be obtained through the test cock 65.

The sterilizer 1 and propagator 2 are interconnected through the flow system 70 including the pipes 71 and 72, filter 73 and by-pass line 74. The filter 73 connects the pipes 71 and 72. The by-pass line 74 connects the pipes 71 and 72 around the filter 73. A first three-way valve 75 connects the by-pass line 74 with the pipe 71 and a second three-way valve 75a connects the by-pass line 74 with the pipe 72. A valve 76 is mounted in the pipe 71 between the sterilizer 1 and the valve 75. The pipe 71 communicates with the lower end of the chamber 6 through an upwardly turned elbow, the open end of which is approximately at the point where the chamber 6 and the collection chamber 9 meet. The pipe 72 connects with the valve 48.

By opening valve 76, wort is passed through pipe 71, valve 75, filter 73, valve 75a, pipe 72 and valve 48 to the discharge pipe 77. Conduit means are connected to the discharge pipe 77 for withdrawing sterilized, filtered, enriched wort from the sterilizer 1 and passing it to additional propagators or one or more prefermenting vessels.

The culture grown in the propagator 2 is removed by means of the pipe 83 controlled by the valve 84. The pipe 83 is provided with an elbow 85 mounted for rotation to the pipe 83 by the swivel joint 86. By means of the handle 87, the elbow 85 may be rotated through an arc of 180°. The purpose of this construction will be described under "Method and operation."

Control valves 96 and 97 are located in the air supply line, one on each side of the air filter 21. These valves permit periodic changing of the cotton filter element in the air filter 21.

For the purpose of admitting water to both the chamber 6 and the chamber 41, valve 96 is closed and valves 92, 95 and 32 are opened to pass water from the pipe 91 to the pipe 71. Water can then be admitted to both vessels by opening their respective valves. Steam is admitted to the pipe 71 for the same purpose by closing valve 92 and opening valve 94.

The filter 73 is of a type suitable for removing all solids such as hops, grain and yeast cells from the sterilized wort as it flows from the sterilizer 1 to the propagator 2.

The temperature in the chambers 6 and 41 is indicated by the thermometers 88. The pressure in the chambers 6 and 41 is indicated by the gauges 89. The pressure in the jacket 11 is indicated by the gauge 90. Water is supplied to the pipe 12 by the conduit 91 and control valve 92. Steam is supplied to the pipe 12 by the conduit 93 and control valve 94. Air may be admitted to the jacket 11 from the pipe 20 by means of the valve 95.

METHOD AND OPERATION

Before either the sterilizer or the propagator is used, both are completely cleaned inside and sterilized. For this purpose, water is admitted to the sterilizer 1 and propagator 2 by connecting water hoses to the discharge pipes 36 and 77. For this purpose, these discharge pipes are equipped with hose couplings. When the sterilizer and propagator are full, the water is boiled by means of steam passed through the jacket 11 and steam admitted to the sterilizer by means of the pipe 26 and valve 32 connecting with the pipe 71. Steam may be admitted to the propagator 2 through valves 95, 32, 75, 75a and 48 and pipes 20, 26, 71 and 72. It may also be admitted through the aerator 51 by opening valves 95 and 53. When steam is admitted to pipe 20, valve 96 is closed to keep the filter 21 dry. All of the pipes, valves and filters involved in the system are thereafter steam sterilized. This accomplished, the water is drained through the valves 10 and 48 and the pipes 36 and 77. During the interim period, if any, between sterilization of the sterilizer and its being charged with wort, it is kept sterile by steam constantly admitted to it.

Wort from the hop-jack is forced into the sterilizer 1 through the valve 10 until the sterilizer is two-thirds charged. The quantity of wort in the sterilizer may be determined by observation of the measuring gauge 80 through the port 24. The valve 10 is then closed and steam is admitted to the jacket 11. The steam heats the wort to a temperature of approximately 212° Fahrenheit, which temperature, for the purpose of sterilization, is maintained for 30 minutes. This is a preferred procedure to shorten the time factor involved. Sterilization can be effected at lower temperatures if the period of heating is lengthened. While the wort is undergoing sterilization, it is constantly agitated by air from the pipe 71. This agitation accelerates the sterilization process. The air accumulating in the sterilizer is released through the pipe 28. During this period any bacteria present in the wort are destroyed, producing a completely sterile liquid. The steam is then shut off and water, or any other suitable coolant, is passed through the jacket 11 to cool the sterilized wort. Aeration is continued through the cooling period to maintain circulation and accelerate cooling.

Before the sterilization of the wort, its pH may be adjusted within the range of 4.4 to 4.8 with any of the known suitable acids. Among the suitable agents for adjusting the pH of the wort are acetic and lactic acid. By adjusting the pH factor of the wort within this range, a maximum quantity of the heat labile B-vitamins, particularly the growth stimulating vitamins, are preserved throughout the sterilization process. In view of the fact that the wort has been previously subjected to prolonged boiling in the brew kettle this is essential. Since yeast does not produce the growth stimulating B-vitamins, it must depend, for propagation, upon these vitamins contained in the wort.

During the cooling, coagulated proteins as well as hop resins settle out and are deposited in the collection chamber 9, where they can be discharged through the pipe 36. This clears the wort of much of its undesirable solids, whereby the filter 73 will be required to remove only a minimum of solids remaining in suspension. The downwardly concave bottom of the sterilizer directs these solids to the central collection chamber 9 where they may collect, safely isolated from the intake end of the pipe 71. At the same time, these solids are concentrated for rapid and complete ejection through the valve 10 and discharge pipe 36 under pressure of sterile air admitted to the chamber 6.

When the wort is cooled to its proper temperature for the propagation of brewer's yeast, approximately 48° Fahrenheit, the valve 76 is opened and a quantity of the wort is caused to flow through the filter 73 into the propagator 2. This flow is effected by means of sterile air under pressure admitted to the top of the sterilizer 1 through the valve 23 and pipe 22. When the desired quantity of wort has been transferred to the propagator, the valves 48 and 76 are closed and the wort in the propagator inoculated.

To inoculate the wort in the propagator, a Carlsburg flask containing the selected strain of yeast is connected to the valve 64. The yeast is injected into the propagator under strictly sterile conditions, such as by flaming the valves. The yeast is injected through the valve 64 under pressure of sterile air obtained from a hose connected to the valve 68 in the pipe 20 (Figure 1) or by gravity. This yeast will ferment the wort and develop a yeast culture several times its original bulk. The time necessary for this fermentation cycle is a period of from 7 to 11 days, depending upon the strain of yeast used. This extended period of time is necessary because of the lowered vitamin B content of the wort, due to the preceding sterilization process. The necessary quantities of the B-vitamins for initiating the propagation of the yeast are provided by that which remains in the wort after sterilization. This low B-vitamin content retards the whole propagation process.

After the yeast has been admitted to the wort, the wort is mixed with the yeast by admitting a current of sterile air through the valve 53 and aerator 51. After this wort has come into krausen a further quantity of wort is transferred from the sterilizer to the propagator. A further period of time elapses during which the culture in the propagator again comes into the state of krausen at which time the final quantity of wort is transferred from the sterilizer to the propagator. After the admission of this last quantity of wort, the fermentation is allowed to continue until its conclusion is reached.

Throughout the entire propagation period a small, continuous stream of air is passed through the wort in the propagator 2. This air is admitted through the aerator 51 and the de-oxygenated air and $CO_2$ are released from the propagator through the pipe 55. This air keeps the culture gently agitated as well as supplying the necessary oxygen for growth. Furthermore, the propagator is kept, throughout its operation, under a pressure slightly higher than that of the atmosphere, to preclude the entrance of outside air through a possible leak.

During the propagation period, the yeast cells in the propagator 2 absorb the growth stimulating B-vitamins from the wort by osmosis. The yeast cells, having once absorbed these vitamins through their selectively permeable membranes, will not readily release them. This process in the propagator 2 amounts to a concentration of the B-vitamins in the yeast cells.

After the last quantity of wort has been transferred from the sterilizer to the propagator a quantity of wort and collected solids remain in the collection chamber 9. The quantity of wort remaining in the collection chamber 9 is determined by the level of the open end of the pipe 71. The valve 76 is then closed and the valve 10 opened to discharge the trub and remaining liquid through the pipe 36 by means of sterile air admitted to the top of the sterilizer. The sterilizer is then washed out again, sterilized and recharged with wort and the process of heating, sterilizing and cooling repeated. The chamber 6 is sterilized by closing valves 50, 96, 53, 75 and 92 and by opening valves 94, 95, 32 and 76. This admits steam to the chamber 6 through the pipes 71, 20 and 22 and valves 76 and 23.

Before sterilization is initiated, the pH of the wort is adjusted to the range of 4.4 to 4.8 in the manner described above. The wort is then sterilized by heating.

When this charge of wort in the sterilizer 1 has been sterilized, but before the temperature is lowered, a quantity of the yeast-beer mixture now present in the propagator 2 is returned to the sterilizer 1. Before this transfer is made, the yeast in the propagator is well mixed with the beer by admitting a strong current of air by opening valves 32, 75, 75a and 48. This permits the sterile air to enter the propagator through pipes 26, 70, 74, 72 and collection chamber 47. This quantity of yeast-beer from the propagator is introduced, preferably, just before sterilization is completed and cooling initiated. A short period of time elapses during which the sterilization temperature is maintained after the quantity of yeast-beer has been returned from the propagator. To return this yeast-beer mixture, the pipes 72, 74 and 71 having first been sterilized, the pipe 48 is opened to the pipe 72. The valves 75 and 75a are opened to transfer this yeast-beer mixture through the filter by-pass line 74, whereby the yeast cells in this mixture will not be filtered out by the filter element 73.

Since the yeast culture in the propagator is of the desired pure strain of yeast and this culture has been developed under aseptic conditions in a closed vessel, no undesirable dead yeast cells or bacteria will be introduced into the sterile wort by this step.

After the yeast cells have been introduced into the sterilized wort in the sterilizer 1 they are heated both by the continued sterilizing heat maintained to finish the sterilization process and by the residual heat of the wort during the early stages of the cooling period. This heat is sufficient to destroy the zymase of these yeast cells and cause them to release their B-vitamins by the process of plasmolysis, thus, enriching the surrounding wort with growth stimulating B-vitamins. During this period, the pH of the wort is adjusted within the range of 4.8 to 4.4. With the pH factor held within this range and the fact that the wort is rapidly cooled, the heat labile B-vitamins discharged from the yeast cells, will not be chemically affected by the heat. The result is a wort enriched with growth stimulating B-vitamins readily available to the yeast cells introduced into this wort after it has been transferred to the propagator 2.

The heating of the wort in the sterilizer, after the sterilizer has been charged from the propagator, is important to reduce the time necessary for plasmolysis to occur. The time necessary for plasmolysis to occur will decrease proportionally as the temperature is increased. Therefore, the purpose of the elevated temperatures is to accelerate the process. The period during which the wort is subjected to boiling after introduction of the wort from the propagator may vary from 0 to 15 minutes. However, this period should not be longer than is necessary to cause plasmolysis because of the adverse effect upon the heat labile vitamins. When a temperature of less than 212 degrees Fahrenheit is maintained, the period of heating must be increased. This is normally effected by retarding the rate of cooling. Thus, when a temperature of 180 degrees Fahrenheit is maintained the period of heating should be about 10 to 15 minutes. The exact period necessary for plasmolysis to occur, at any given temperature, is also dependent upon the concentration of plasmolytic agents present, such as sugar or salt. The total absence of plasmolytic agents may necessitate doubling the length of the heating period. Unless plasmolysis does occur, the B-vitamins in these cells will not be released into the wort, and therefore, they would not be available to the yeast in the propagator. Without this step of plasmolyzing the yeast returned from the propagator, the entire process of returning this wort to the sterilizer would produce a nullity.

The fermented yeast-beer mixture also contains alcohol which becomes available as yeast food and further stimulates propagation. As the alcohol tends to evaporate when injected into the hot wort, it is imperative that such evaporation be prevented. Therefore, valve 29 is closed and a slightly higher than atmospheric pressure is maintained by opening valve 23. As soon as the thermometer indicates that the wort temperature is low enough to prevent evaporation of the alcohol valve 23 is closed and valve 29 is opened as well as valves 32 and 76 and gentle aeration of the wort is continued for a short period. If the pressure is not increased, immediately after the injection of the yeast-beer mixture is completed, the heat must be rapidly reduced below the boiling point of alcohol. When this is done the length of the heating period must be increased.

A quantity of yeast from the previous fermentation, remains in the collection chamber 47 at the bottom of the propagator 2. The quantity that remains in the collection chamber 47 is determined by the position of the elbow 85. When this elbow is up, as shown in Figure 1, a greater quantity will remain than when the elbow is rotated 180° to its maximum downward position. The yeast remaining in the collection chamber 47, after the culture has been removed through the pipe 83, constitutes the inoculum for the next charge of vitaminized wort introduced into the propagator 2 through the valve 48.

All transfer pipes and the filter are cleaned and steam sterilized before transfer of the wort from the sterilizer to the propagator. The cooled wort in the sterilizer is then passed through the filter 73 into the propagator 2. The filter 73 will remove the solids of every type from the wort, including any yeast cells injected into the wort during the flowback process when the sterile wort is charged from the propagator.

A quantity of the cooled, enriched wort is then transferred from the sterilizer 1 to the propagator 2. As this first quantity of wort enters the propagator 2, it passes up through the collection chamber 47. As it does so, it becomes inoculated with the yeast cells remaining in the collection chamber 47. Further, the yeast cells are thereby thoroughly dispersed throughout the incoming wort whereby, with the help of aeration, a vigorous fermentation is substantially, immediately initiated. This contributes to the acceleration of the propagation cycle. The remaining quantities of wort in the sterilizer 1 are subsequently transferred in stages as previously described.

The growth stimulating vitamins in the wort, being immediately available to the yeast cells and in greater concentration, reduce the necessary period for propagation. It also produces a culture of healthy, vigorous yeast cells. This vitamin enriched wort requires a period of only 6 to 8 days, depending on the yeast strain, to produce a complete culture. Thus, a saving of from 1 to 3 days is effected. In addition, the resulting culture is more vigorous and will not only be less subject to infection in the brewery fermenters, but will produce a beer of better quality. My process reduces both the time and equipment necessary to obtain a given quantity of pitching yeast.

*Example I*

A sterilizer and a propagator were used, each having a working capacity of 66 gallons, and provided with sources of steam, sterile air and an interconnected flow system as I have described above. The sterilizer was charged with 66 gallons of wort withdrawn from the brewery hop-jack. This wort was heated to a temperature of 212° Fahrenheit for 29 minutes. At this time, the by-pass line between the propagator and the sterilizer was opened and one gallon of beer-yeast mixture was transferred from the propagator to the sterilizer after the yeast and beer had been thoroughly mixed within the propagator. The by-pass line was then closed and the heating of the wort in the sterilizer was continued for one minute at 212° Fahrenheit. The pressure in the sterilizer was raised slightly above atmospheric pressure. After one minute the steam supplied to the jacket of the sterilizer was stopped and cooling water passed through the jacket to rapidly cool the wort.

When this wort was cooled to approximately 48° Fahrenheit, ten gallons of this wort was transferred to the propagator, which propagator was provided with a quantity of the desired strain of yeast in the collection chamber at the bottom of the propagator. This wort was passed upwardly through this yeast to cause a thorough mixing of the yeast and the wort. Further mixing of the yeast with the wort was accomplished by admitting a current of sterile air through the aerator at the bottom of the propagator. This wort came into krausen in approximately 12 hours. At this time, a further 20 gallons of wort were transferred from the sterilizer to the propagator. Fermentation was continued and after an additional 12 hours a state of krausen was again appearing. At this time, the final quantity of 36 gallons of wort were transferred from the sterilizer to the propagator. After a period of 7 days from the initiation of the fermentation cycle a complete fermentation was accomplished. At this time, the culture in the propagator was transferred to the brewery fermenters.

In breweries with large production, two or more propagators may be employed, all of which are served by one sterilizer. Any additional propagator would be connected to the left of the one shown in Figure 1 and connected with the discharge pipe 77, thus, utilizing a single filter and by-pass arrangement. In addition, the culture may be passed through prefermenters after it leaves the propagator and is finally used as pitching yeast in the fermenters. To pitch the prefermenters, the beer-yeast mixture is transferred, under pressure of sterile air, from the propagator to a prefermenter of greater capacity, which preferably is located in the same, or an adjoining sanitary room. This prefermenter has previously been cleaned and stem sterilized. After the introduction of the pitching yeast from the propagator, a quantity of cooled wort from the brew house is added and which, with aeration, will start to ferment. When this yeast and wort mixture comes into krausen, a further quantity of cooled wort from the brew house is added. This will reach a state of krausen and will be permitted to ferment out to the desired Balling. This may take as long as 9 days and yield pitching yeast ready for the fermenters.

Example II

A sterilizer and a propagator were used, each having a working capacity of 66 gallons and provided with sources of steam, sterile air and an interconnected flow system as I have described above. The sterilizer was charged with 66 gallons of wort withdrawn from the brewery hop-jack. This wort was heated to a temperature of 212° Fahrenheit for 29 minutes. At this time, the by-pass line between the propagator and the sterilizer was opened and one gallon of beer-yeast mixture was transferred from the propagator to the sterilizer after the yeast and beer had been thoroughly mixed within the propagator. The by-pass line was then closed and the heating of the wort in the sterilizer was continued for one minute at 212° Fahrenheit. The pressure in the sterilizer was raised slightly above atmospheric pressure. After one minute the steam supplied to the jacket of the sterilizer was stopped and cooling water passed through the jacket to rapidly cool the wort.

When the wort was cooled to approximately 48° Fahrenheit, ten gallons of this wort was transferred to the propagator, which propagator was provided with a quantity of the desired strain of yeast in the collection chamber at the bottom of the propagator. This wort was passed upwardly through this collection of yeast to cause a thorough mixing of the yeast and the wort. Further mixing of the yeast with the wort was accomplished by admitting a current through the aerator at the bottom of the propagator. This wort came into krausen in approximately 12 hours. At this time a further 20 gallons of wort were transferred from the sterilizer to the propagator. Fermentation was continued and after an additional 12 hours a state of krausen was again appearing. At this time, the final quantity of 36 gallons of wort were transferred from the sterilizer to the propagator. After a period of 7 days from the initiation of the fermentation cycle a complete fermentation was accomplished.

A prefermenter having a sixty barrel capacity was used. The culture of yeast obtained from the propagator was introduced into this prefermenter. To this, ten barrels of cooled wort from the brew house were added. This was allowed to ferment and reached a state of krausen by the end of 15 hours. At this time forty additional barrels of cooled wort from the brew house were introduced to the prefermenter. After the addition of these forty barrels, the beer-yeast mixture reached a state of krausen by the end of 15 hours. This was allowed to ferment for a period of 9 days. At the end of this period the prefermenter yielded approximately 250 pounds of pitching yeast, enough yeast to pitch 330 barrels of wort.

The method of enriching the wort in the propagator with growth stimulating yeast vitamins can be applied to the wort in the prefermenter, thus, stimulating more vigorous fermentation and shortening the fermentation cycle in the prefermenter considerably. The use of the vitamin enriched wort in the prefermenter accelerates yeast cell growth, reducing the time necessary to reach krausen. The period necessary in the prefermenter can be reduced from 1 to 3 days over that necessary when enriched wort is not used. Thus, a total saving in time necessary in the propagator and the prefermenter of from 2 to 6 days can be effected. The saving of time and equipment is accumulative throughout the entire process of developing a culture large enough for the brewery fermenters.

Since the time required for sterilization is much less than that for propagation, a single sterilizer 1 will be connected with a number of propagators 2 and frequently an additional number of prefermenters. This connection is made through the pipe 77. When the sterilizer is used to service several propagators, it is desirable that a flow system, including a by-pass line similar to the flow back system 70 be used between the sterilizer and several of the propagators in order to assure an available supply of vitamin rich yeast cells for charging the sterilizer. Thus, one propagator would be able to serve the sterilizer while another was empty or in the early stages of its propagation cycle. These enlargements are merely multiplication of the equipment herein described, each involving the same principles of operation.

I have described my invention as used with equipment having a certain wort and yeast capacity. Although this capacity is that normally employed in breweries, it will be recognized that equipment having a capacity either greater or smaller than this may be employed where needed. While I have illustrated and described what I regard as the preferred process of my invention, and the preferred apparatus for carrying through this process, nevertheless, it will be understood that such are merely exemplary and that numerous modifications and rearrangements may be made therein without departing from the essence of my invention. Many of the modifications will arise from the adaption of my method and apparatus from one industry to another as from the brewing industry to the distillery or the production of yeast for baking purposes. Each of these modifications is to be considered as included in the hereinafter appended claims unless the language of these claims expressly states otherwise.

I claim:

1. In a process for propagating a culture of a selected pure strain of micro-organisms in a suitable, liquid, culture medium, the steps which include: heating a quantity of said culture medium to a temperature sufficient to sterilize said culture medium; propagating a quantity of said selected micro-organisms in a culture medium containing growth stimulating vitamins wherein said micro-organisms will absorb said growth stimulating vitamins; introducing said quantity of said micro-organisms into said hot, sterile, culture medium; maintaining the temperature of said hot, culture medium, after introduction of said micro-organisms, high enough and for a long enough period of time to cause said micro-organisms to release said growth stimulating vitamins by plasmolysis; cooling said culture medium; introducing an inoculum of said selected micro-organisms into said cooled culture medium.

2. In a process for propagating a culture of a selected strain of micro-organisms as described in claim 1 wherein said medium is filtered after cooling and before the introduction of the inoculum.

3. In a process for propagating a culture of a selected pure strain of micro-organisms in a suitable, liquid, culture medium, the steps which include: heating a quantity of said culture medium to a temperature sufficient to sterilize said culture medium; propagating a quantity of said selected micro-organisms in a culture medium containing growth stimulating vitamins wherein said micro-organisms will absorb said growth stimulating vitamins; introducing said quantity of said micro-organisms into said hot, sterile, culture medium; maintaining the temperature of said hot, culture medium, after introduction of said micro-organisms, above 200 degrees Fahrenheit for a period of time sufficient to plasmolyze said micro-organisms; cooling said culture medium; introducing an inoculum of said selected micro-organisms into said cooled culture medium.

4. In a process for propagating a culture of a selected pure strain of micro-organisms in a suitable, liquid, culture medium, the steps which include: heating a quantity of said culture medium to a temperature sufficient to sterilize said culture medium; propagating a quantity of said selected micro-organisms in a culture medium containing growth stimulating vitamins wherein said micro-organisms will absorb said growth stimulating vitamins; introducing said quantity of said micro-organisms into said hot, sterile, culture medium; maintaining the temperature of said hot, culture medium, after introduction of said micro-organisms, between 180 degrees Fahrenheit and the boiling point of said culture medium for one to ten minutes; cooling said culture medium; introducing an inoculum of said selected micro-organisms into said cooled culture medium.

5. In a process for propagating a culture of a selected pure strain of micro-organisms in a suitable, liquid, culture medium, the steps which include: heating a quantity of said culture medium to a temperature sufficient to sterilize said culture medium; propagating a quantity of said selected micro-organisms in a culture medium containing growth stimulating vitamins wherein said micro-organisms will absorb said growth stimulating vitamins; introducing said quantity of said micro-organisms into said hot, sterile, culture medium; maintaining the temperature of said hot, culture medium, after introduction of said micro-organisms, at the boiling temperature of said culture medium for one minute; rapidly cooling said culture medium; introducing an inoculum of said selected micro-organisms into said cooled culture medium.

6. In a process for propagating a culture of a selected pure strain of micro-organisms in a suitable, liquid, culture medium, the steps which include: heating a quantity of said culture medium to a temperature sufficient to sterilize said culture medium; propagating a quantity of said selected micro-organisms in a culture medium containing growth stimulating vitamins wherein said micro-organisms will absorb said growth stimulating vitamins; introducing said quantity of said micro-organisms into said sterile culture medium; maintaining the temperature of said culture medium, after introduction of said micro-organisms, between 180 degrees Fahrenheit and the boiling point of said culture medium for one to ten minutes; cooling said culture medium; introducing an inoculum of selected micro-organisms into said cooled culture medium.

7. In a process for propagating a culture of a selected strain of micro-organisms as described in claim 6 wherein the pH of said culture medium is maintained within the range of 4.4 to 4.8 in the step of heating a quantity of said culture medium to a temperature sufficient to sterilize said culture medium.

8. In a process for propagating a culture of a selected pure strain of unicellular fungi in a suitable, liquid, culture medium, the steps which include: heating a quantity of said culture medium to a temperature sufficient to sterilize said culture medium; propagating a quantity of said unicellular fungi in a culture medium containing growth stimulating vitamins wherein said unicellular fungi will absorb said growth stimulating vitamins; introducing said quantity of said unicellular fungi into said hot, sterile, culture medium; maintaining the temperature of said hot, culture medium, after introduction of said unicellular fungi, between 180 degrees Fahrenheit and the boiling point of said culture medium for one to ten minutes; cooling said culture medium; introducing an inoculum of said selected unicellular fungi into said cooled culture medium.

9. In a process for propagating a culture of a selected strain of micro-organisms in a suitable, liquid medium, the steps which include: heating a first quantity of said medium to a temperature sufficient to sterilize said first culture medium; propagating a quantity of said selected micro-organisms in a culture medium containing growth stimulating vitamins wherein said micro-organisms will absorb said growth stimulating vitamins; introducing said propagated micro-organisms into said hot, sterile, first culture medium; maintaining the temperature of said hot, first culture medium, after introduction of said micro-organisms, above 200 degrees Fahrenheit for a period of time sufficient to plasmolyze said micro-organisms; cooling said first culture medium; filtering said first culture medium; introducing an inoculum of said selected micro-organisms into said filtered first culture medium; sterilizing a second quantity of said culture medium; introducing a quantity of said first culture medium containing said propagated micro-organisms into said second culture medium while said second culture medium, after introduction of said quantity of said first culture medium, is maintained above 200 degrees Fahrenheit for a period of time sufficient to plasmolyze said micro-organisms present in said second culture medium.

10. In a process for propagating a culture of a selected pure strain of yeast, the steps which include: heating a quantity of wort to a temperature sufficient to sterilize said wort; introducing into said sterile wort a quantity of beer containing yeast cells of the selected strain; maintaining the temperature of said wort, after introduction of said quantity of wort containing said yeast cells, between 180 degrees Fahrenheit and the boiling point of said wort-beer mixture for one to ten minutes; cooling said beer-wort mixture; filtering said beer-wort mixture; introducing an inoculum of said selected yeast strain into said filtered beer-wort mixture; propagating said yeast culture in said beer-wort mixture.

11. In a process for propagating a culture of a selected strain of yeast as described in claim 10 wherein said beer-wort mixture is maintained under a sufficient pressure to prevent boiling of ethyl alcohol in the temperature range of 180° and the boiling point of said beer-wort mixture.

12. In a process for propagating a culture of a selected pure strain of yeast as described in claim 10 wherein the pH of said wort is maintained within the range of 4.4 to 4.8.

13. In a process for propagating a culture of a selected pure strain of yeast, the steps which include: heating a quantity of wort to a temperature sufficient to sterilize said wort, introducing into said sterile wort a quantity of wort containing yeast cells; maintaining the temperature of said wort, after introduction of said quantity of beer containing said yeast cells, at the boiling temperature of said wort for one minute; cooling said wort; filtering said wort; introducing an inoculum of said selected yeast strain into said filtered wort; propagating said yeast culture in said wort.

14. In a process for propagating a culture of a selected pure strain of yeast, the steps which include: heating a first quantity of wort to a temperature sufficient to sterilize said wort, introducing into said sterile first wort a quantity of wort containing yeast cells of the selected strain; maintaining the temperature of said first wort, after introduction of said quantity of wort containing said yeast cells, above 200 degrees Fahrenheit for a period of time sufficient to plasmolyze said yeast cells; cooling said first wort; filtering said first wort; introducing an inoculum of said selected yeast strain into said filtered first wort; propagating said yeast culture in said wort; sterilizing a second quantity of wort; introducing into said second wort a quantity of said first wort containing yeast cells propagated from said inoculum; maintaining the temperature of said second wort, after introduction of said quantity of said first wort, high enough and for a sufficient period of time to cause said yeast cells to release their growth stimulating vitamins by plasmolysis.

15. In a process for propagating a culture of a selected pure strain of yeast as described in claim 14 wherein the quantity of said first wort introduced into said second wort is approximately 1.5% of the quantity of said second wort.

16. In apparatus for propagating a culture of a selected pure strain of micro-organisms in a suitable liquid culture medium the combination comprising: a first vessel having an enclosed central chamber; a second vessel having an enclosed central chamber; means for heating said first vessel; means for introducing said liquid medium into said first vessel; a pipe communicating at one of its ends with said first vessel and at the other of its ends communicating with said second vessel; a filter intermediate the ends of said pipe; a second pipe communicating with said first pipe adjacent each end of said filter; a valve at each end of said second pipe for connecting said second pipe to said first pipe.

17. In apparatus for propagating a culture of a selected pure strain of micro-organisms in a suitable liquid culture medium, the combination comprising: a first vessel having an enclosed sterilizing chamber; a housing depending from said first vessel, said housing defining a first auxiliary chamber communicating with said sterilizing chamber; a second vessel having an enclosed propagation chamber; a housing depending from said second vessel, said housing defining a second auxiliary chamber communicating with said propagation chamber; a pipe at one of its ends communicating with said sterilizing chamber substantially at the juncture of said sterilizing chamber and said first auxiliary chamber; said pipe at its other end communicating with the bottom of said second auxiliary chamber; a filter intermediate the ends of said pipe; a by-pass conduit on one of its ends communicating with said pipe intermediate said sterilizing chamber and said filter and on the other of its ends communicating with said pipe intermediate said auxiliary chamber and said filter; a discharge conduit communicating with said second auxiliary chamber substantially above the bottom thereof; means for heating said sterilizing chamber.

18. In apparatus for propagating a culture of a selected pure strain of micro-organisms as described in claim 17 wherein an elbow is rotatably mounted on the end of the discharge pipe received into said second auxiliary chamber whereby the vertical position of the point of communication between the discharge pipe and the second auxiliary chamber may be adjusted.

19. In the apparatus for propagating a selected pure strain of micro-organisms as described in claim 17, a viewer plate attached to each of said vessels, means to cast light into the interior of each of said vessels, and a visual depth gauge inside of each of said vessels consisting of a depending rod with fins radiating therefrom in the manner of a helix.

20. In the apparatus for propagating a selected pure strain of micro-organisms as described in claim 17, a collection chamber extending from the concave bottom of said vessels, said collection chamber being restricted by a three-way valve.

References Cited in the file of this patent

UNITED STATES PATENTS

| Number | Name | Date |
| --- | --- | --- |
| 1,043,361 | Romer | Nov. 5, 1912 |
| 2,016,791 | Riley | Oct. 8, 1935 |
| 2,147,271 | Schwarz et al. | Feb. 14, 1939 |
| 2,285,465 | Schultz et al. | June 9, 1942 |
| 2,295,036 | Gorcica et al. | Sept. 8, 1942 |